United States Patent
Kao

(10) Patent No.: US 7,042,269 B2
(45) Date of Patent: May 9, 2006

(54) METHOD FOR DYNAMIC BALANCING OF A CLOCK TREE

(75) Inventor: De Yu Kao, Taipei (TW)

(73) Assignee: Princeton Technology Corporation, Taipei County (TW)

(*) Notice: Subject to any disclaimer, the term of this patent is extended or adjusted under 35 U.S.C. 154(b) by 0 days.

(21) Appl. No.: 10/883,720

(22) Filed: Jul. 6, 2004

(65) Prior Publication Data

US 2006/0006917 A1    Jan. 12, 2006

(51) Int. Cl.
*G06F 1/04*    (2006.01)

(52) U.S. Cl. ..................... 327/295; 327/565
(58) Field of Classification Search ........ 327/291–297, 327/565; 716/2, 6, 14
See application file for complete search history.

(56) References Cited

U.S. PATENT DOCUMENTS

| | | | | |
|---|---|---|---|---|
| 5,774,371 A | * | 6/1998 | Kawakami | 716/10 |
| 6,326,812 B1 | * | 12/2001 | Jefferson | 326/93 |
| 6,550,045 B1 | * | 4/2003 | Lu et al. | 716/6 |
| 6,653,883 B1 | * | 11/2003 | Schultz | 327/291 |
| 6,751,786 B1 | * | 6/2004 | Teng et al. | 716/18 |
| 6,763,513 B1 | * | 7/2004 | Chang et al. | 716/14 |
| 6,782,519 B1 | * | 8/2004 | Chang et al. | 716/6 |
| 6,897,699 B1 | * | 5/2005 | Nguyen et al. | 327/295 |

* cited by examiner

*Primary Examiner*—Dinh T. Le
(74) *Attorney, Agent, or Firm*—Birch, Stewart, Kolasch & Birch, LLP

(57) ABSTRACT

The present invention provides a method to balance a clock tree dynamically. A controllable buffer is inserted in a specific level of a clock tree, and a controller is provided for adjusting two clocks with different skew by controlling the PMOS/NMOS arrangements in the controllable buffer so as to generate more current for compensating the time delay of slow clock to a sink. This method effectively suppressed the clock skew generated by the voltage drop or the temperature variations in the synchronous logic circuit design.

2 Claims, 3 Drawing Sheets

METHOD FOR DYNAMIC BALANCING OF A CLOCK TREE

FIELD OF THE INVENTION

The present invention relates to a method for balancing the clock skew in the synchronous logic circuit design, and more particularly to a special designed circuit for balancing the clock tree to adjust the clock skew in a synchronous logic circuit design.

BACKGROUND OF THE INVENTION

In designing a synchronous circuit, it is an assumption that all memory devices use the "same clock", the clock at each memory device switches at the same time (from high to low or from low to high), and all the rest combinational logic blocks share the same clock interval, so the setup time and hold time related to a clock to change state can be estimated by the memory devices, flip-flop, latch, etc. However, different routing lengths for the clock to be connected to a device and different input capacitance of a specific device make the above assumption unrealistic.

In FIG. 1, it is shown that the clock propagated from the clock source 0 to the sink 1 is faster than the clock propagated to the sink n, since the wire to sink n is longer than the wire to sink 1. A longer wire has a higher resistance and capacitance, which causes the time delay of the clock.

Currently, circuit designer uses the clock synthesis tools to generate a "balanced clock tree" which partitiones the fanout of a clock source 0 into several groups and puts each group as a branch of the clock source 0. Repeating the partition process stated above to the branches and so on, a clock tree is generated, as shown in FIG. 2. The clock synthesis tool can consider the wire RC and the gate input capacitance to make the routing from the clock source 0 to each sink the same length, so the clock to each sink has the same time delay. This idea has been applied to the most primitive H-Tree as well as to the most recent Steiner-Tree. Once the clock tree has been generated, the delay from the clock source 0 (root of the clock tree) to the sinks (leafs of the clock tree) should be the same.

If it is impossible by just using the "balanced clock tree" to compensate the time delay, a circiuit designer will insert buffers 20 into appropriate branches (hot branch) so as to creat a "buffer tree" as shown in FIG. 2. A buffer comprises of two inverters.

The above method assumes that the temperature and the voltage are both homogenous across the entire circuit all the time, i.e. the above method deems the tree is in a static state, but actually it is not true for an operating integrated circuit chip.

An operating integrated circuit chip has different surface temperature in different area, since some circuit blocks have more switching activities than the rest of the chip. The temperature differences will cause different mobility of the holes/electrons in the semiconductor device and also change the resistance of the metal wires. These phenomena also cause the time delay from the clock source 0 to the sinks. Moreover, circuitries generate more activities (more heat) will cause more voltage drop, the more voltage drop will make the local Vdd (power supply) lower than the rest parts of the chip so as to make some related devices (for instance: the inserted buffers) respond slower than other devices with a normal Vdd. Both the voltage drop and the temperature increasement make the above "balanced" clock tree unbalanced.

In order to take care of all the corner circuits with different temperature and voltage drop, the commercial CAD tools insert too many buffers in a clock tree, which makes the clock balance getting worst, since active devices (for instance: buffers) are effected by the voltage and temperature more than passive device (wire).

OBJECT OF THE INVENTION

It is therefore an object of the present invention to provide a controllable buffer to be inserted in a specific level of a clock tree, and provide a controller for adjusting two clocks with different skew by controlling the PMOS/NMOS arrangements in the controllable buffer so as to generate more current for compensating the time delay of slow clock to a sink.

DETAILED DESCRIPTION OF THE INVENTION

Figure 1:
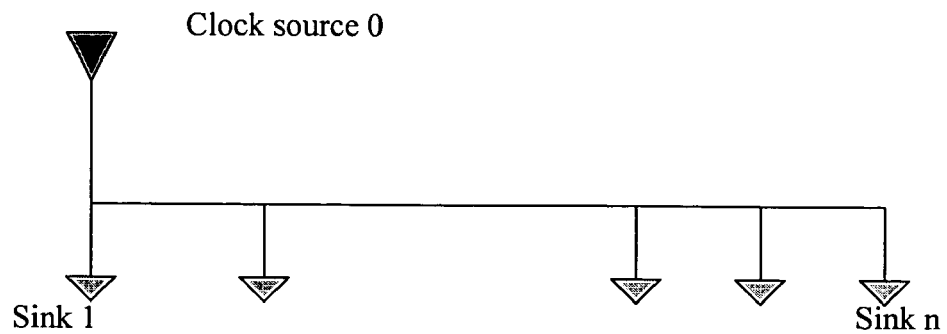
FIG. 1 shows schematically an unbalanced clock network.
Figure 2:
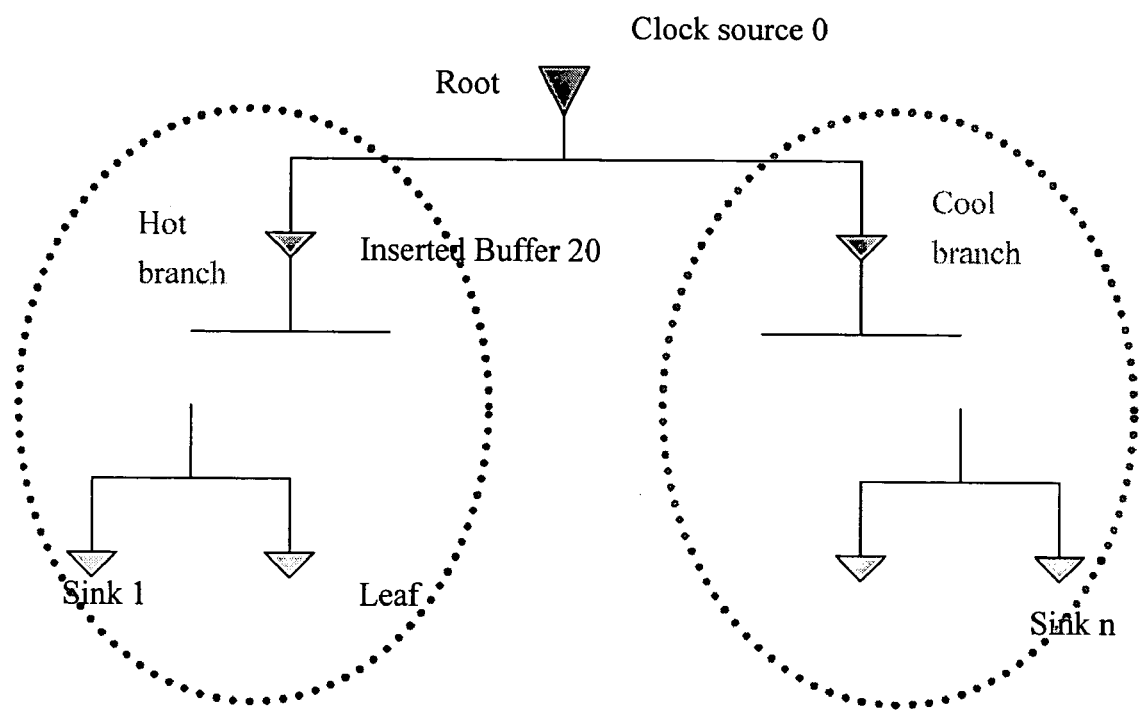
FIG. 2 shows schematically a balanced clock network.
Figure 3:
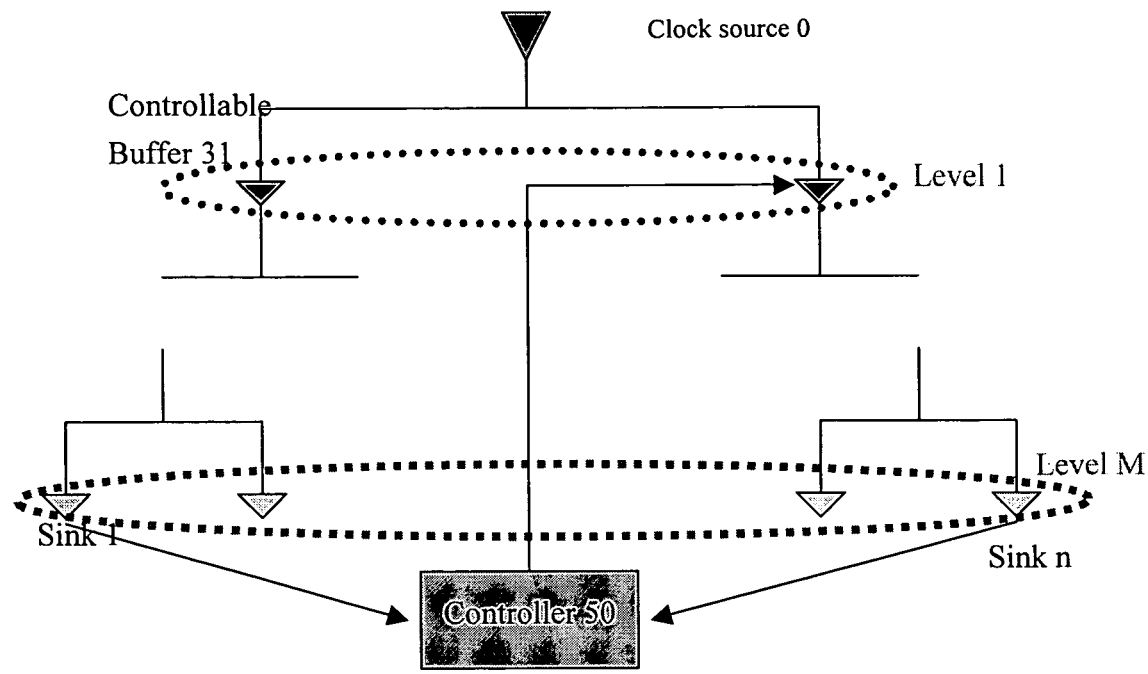
FIG. 3 shows schematically a dynamic balanced clock tree according to the present invention.

Referring to the FIG. 3, a clock tree is shown, a controllable buffer 31 is inserted for a specific level of the tree, and a controller 50 is provided for controlling the controllable buffer 31.

Figure 4:
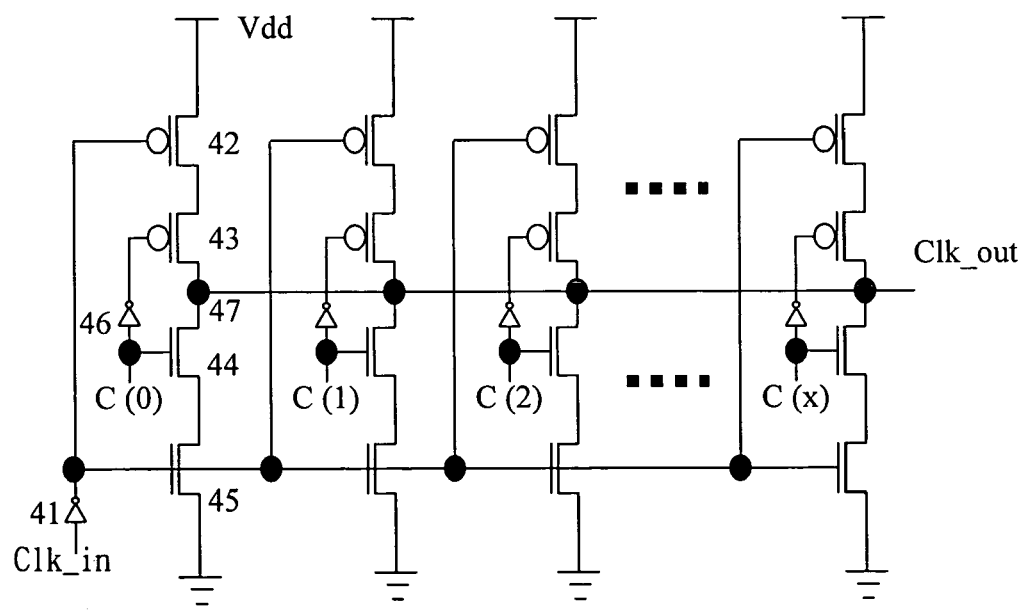
FIG. 4 shows schematically an example of the controllable buffer according to the present invention.

An example of the controllable buffer 31 is shown in FIG. 4, in which there are several columns of PMOSs and NMOSs in combination. Each column has two PMOSs and two NMOSs connected serially as shown. The clock input signal Clk_in is inputted through an inverter 41 to the gates of the top PMOS 42 and the bottom NMOS 45 of each column. Control signals C(0), C(1), ... C(x) are inputted to the gates of the central PMOS 43 and NMOS 44 of each column respectively. An inverter 46 is inserted between the gates of the central PMOS 43 and NMOS 44 of each column respectively.

As each of the control signals C(0), C(1), C(2), ... C(x) is "1" (high voltage), a duplicated clock signal Clk_in will be present as the clock output signal Clk_out at the output terminal 47, at a connection point between the central PMOS 43 and NMOS 44 in each column. As each of the control signals C(0), C(1), C(2), ... C(x) is "0" (low voltage), a high impedance will be present at the output terminal 47 of each column.

Therefore, the control signals C(0), C(1), C(2), ... C(x) can control how many columns are connected in parallel to provide the clock output signal Clk_out. The more columns are connected in parallel to provide the clock output signal Clk_out, the more current will be provided to the output. The clock output signal Clk_out will be inputted to the next level of the clock tree.

Figure 5:
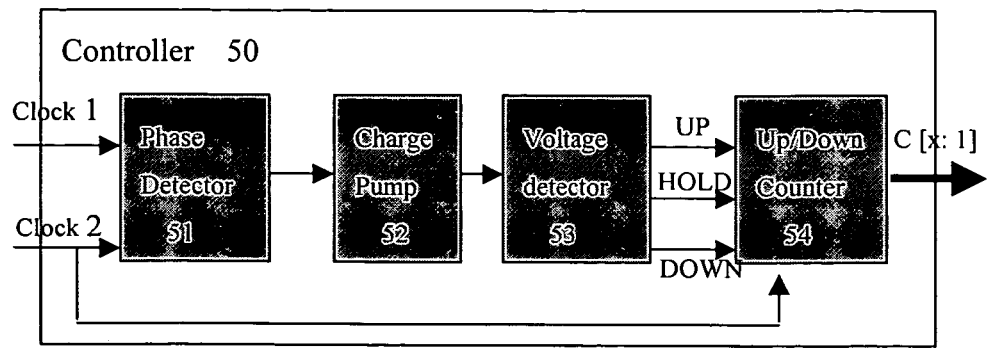
FIG. 5 shows schematically the block diagram of a controller according to the present invention.

Referring to FIG. 5, a controller 50 is designed according to a phase-locked loop (PLL) circuit, in which two clocks of two different sinks (leaves) are inputted to the controller 50. The controller 50 can compare the phase difference between the two inputted clocks through a phase detector 51, and then generate suitable voltage by a charge pump circuit 52, after that the voltage detector 53 is used to generate up, hold and down signals to instruct the up/down counter 54 to control an output bus C[x:0]. The output bus C[x:0] comprises C(0), C(1), C(2), . . . C(x), and C(0), C(1), C(2), . . . C(x) are fed to the gates of the central PMOS 43 and NMOS 44 of each column respectively.

Figure 6:
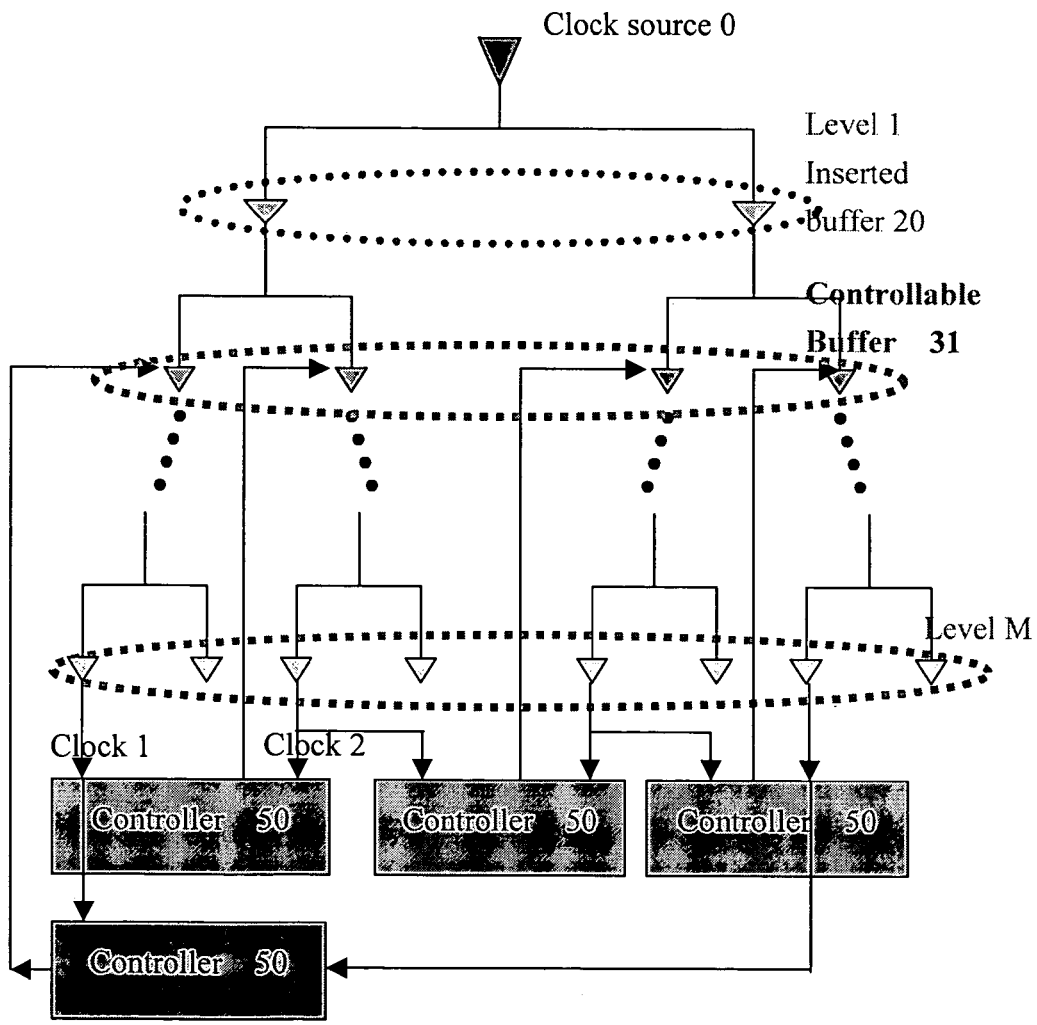
FIG. 6 shows schematically a dynamic balanced clock tree with control feedback loop according to the present invention.

Referring to FIG. 6, the controller 50 is arranged for any two sinks to accept related clocks, and compare the phase difference to generate an output bus C[x:0] to be fed to a specific level of the clock tree for adjusting the number of columns to be connected parallelly to provide the clock output signal Clk_out, and to provide a suitable output current to drive related sink x, so as to compensate the phase difference between the two clocks.

Referring to FIG. 6, controllers 50 can be arranged respectively for different clock pairs, therefore form a control feedback loop as shown.

The spirit and scope of the present invention depend only upon the following claims, and are not limited by the above embodiments.

What is claimed is:

1. A method for dynamic balancing of a clock tree, comprising the steps of:

inserting a controllable buffer in a level of the clock tree, the controllable buffer comprising a plurality of columns of PMOSs and NMOSs in combination, each column having two PMOSs and two NMOSs connected serially, a clock input signal being inputted through an inverter to the gates of a top PMOS and a bottom NMOS of each column respectively, an inverter being inserted between the gates of a central PMOS and NMOS of each column respectively, a clock output signal being presented at points of connection the central PMOSs and the central NMOS;

providing a controller for accepting any two clocks; and controlling the controllable buffer by an output bus C[x:0] of the controller wherein control signals C(0), C(1) C(2) . . . C(x) of the output bus C[x:0] are inputted to the gates of central PMOS and NMOS of each column respectively, wherein more current is generated at an output of the controllable buffer for compensating a time delay of a clock signal to a sink of the clock tree.

2. The method according to claim 1, wherein the controller comprises a phase detector, a charge pump circuit, a voltage detector, an up/down counter and the output bus C[x:0].

* * * * *